UNITED STATES PATENT OFFICE.

ALCIDE FRANÇOIS POIRRIER, OF PARIS, FRANCE.

NITROSO DYE.

SPECIFICATION forming part of Letters Patent No. 420,311, dated January 28, 1890.

Application filed September 23, 1889. Serial No. 324,822. (No specimens.) Patented in France January 24, 1889, No. 195,605, and in England March 22, 1889, No. 5,032.

*To all whom it may concern:*

Be it known that I, ALCIDE FRANÇOIS POIRRIER, of Paris, in the Republic of France, have invented a new and useful Improvement in the Production of Coloring-Matters, whereof the following specification is a full, clear, and exact description.

The invention has been patented in France by Patent No. 195,605, dated January 24, 1889, and Great Britain by Patent No. 5,032, dated March 22, 1889.

This invention has for its object the preparation of coloring-matters from the nitrosos of aromatic amines.

I have observed that under the influence of heat the salts of the paranitroso derivatives are transformed into coloring-matters of variable tints passing from brown to gray. Among the paranitroso derivatives employed for this purpose may be mentioned, first, the nitrosos of tertiary amines, such as dimethylaniline, ethylaniline, methylethylaniline, dimethyltoluidine, dimethylnaphthylamine, &c.; second, the nitrosos of secondary amines, such as monoethylaniline, diphenylamine, monomethyltoluidine, &c.

The following is given as an example of the preparation of the coloring-matter, which example will enable those skilled in the art to carry the invention into effect. Ten kilos of hydrochlorate of nitroso-dimethylaniline are dissolved in fifty liters of water, and the solution is heated to boiling-point for three hours. After cooling the product is run into one hundred liters of water, and the coloring-matter is precipitated from the solution by means of a mineral salts, such as chloride of zinc. The precipitated coloring-matter is collected on the filter and dried at 80° centigrade. The reaction may be effected as well in an alcoholic medium as in water, and the alcohol or water may even be replaced by benzine, toluine, or other hydrocarbon.

The mode of procedure pointed out above applies equally if in place of nitroso-dimethylaniline other nitroso derivatives of tertiary or secondary amines be employed.

The tints of the resultant coloring-matters vary from brown to gray. They are all obtained in the form of a brown powder soluble in water, alcohol, and acids. The solutions are precipitated by alkalies and alkaline carbonates, giving brown flakes which are sufficiently soluble in hot water and insoluble in cold water.

The new coloring-matters are basic, and dye cotton mordanted with tannin, giving gray tints very resisting to soap, the atmosphere, and light. They can be printed on cotton mordanted with tannin.

I claim as my invention—

1. The process of preparing the specified coloring-matters, varying in tint from brown to gray, by subjecting the salts of the nitroso aromatic amines to the influence of heat in a menstruum, substantially as described.

2. The process of obtaining coloring-matter by heating in a suitable medium—such as water—a salt of a nitroso derivative of secondary or tertiary amines, and separating the coloring-matter from solution by precipitation with a mineral salt, substantially as described.

3. The new coloring-matters herein described derived from the nitrosos of aromatic amines, said coloring-matters varying in tint from brown to gray, and being characterized by solubility in water, alcohol, and acids, and their solutions yielding by precipitation with alkalies and alkaline carbonates flakes soluble in hot water and insoluble in cold water, as hereinbefore set forth.

In witness whereof I have hereunto signed my name in the presence of two subscribing witnesses.

ALCIDE FRANÇOIS POIRRIER.

Witnesses:
R. J. PRESTON,
JULES ARMENGAUD, Jeune.